(No Model.)

D. S. TROY & J. S. DAVIS.
SEEDING MACHINE.

No. 331,263. Patented Nov. 24, 1885.

WITNESSES:
Robert Kirk.
Dugald McKillop.

INVENTOR:
Daniel S. Troy
John S Davis
By

UNITED STATES PATENT OFFICE.

DANIEL S. TROY AND JOHN S. DAVIS, OF MONTGOMERY, ALABAMA.

SEEDING-MACHINE.

SPECIFICATION forming part of Letters Patent No. 331,263, dated November 24, 1885.

Application filed August 1, 1885. Serial No. 173,224. (No model.)

*To all whom it may concern:*

Be it known that we, DANIEL S. TROY and JOHN S. DAVIS, of Montgomery, in the county of Montgomery and State of Alabama, have invented a new and useful Improvement in Seeding-Machines, which improvement is fully set forth in the following specification and accompanying drawings, in which—

Figure 1:
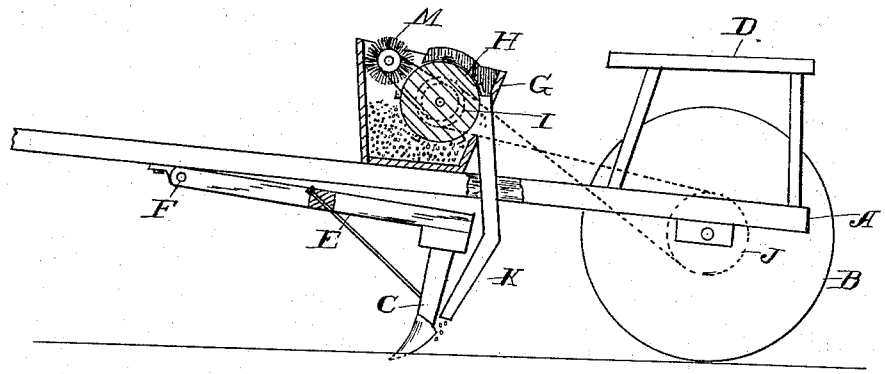
Figure 2:
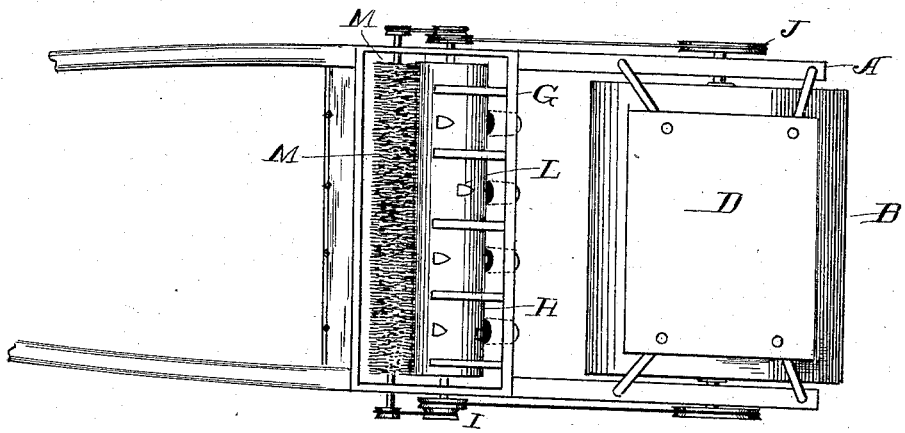
Figure 3:
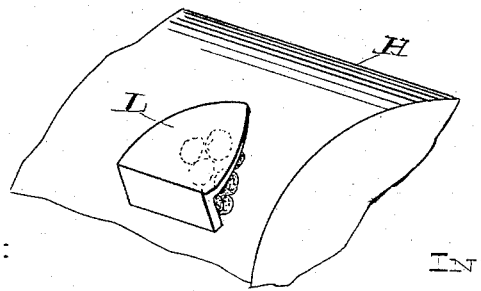

Figure 1 is a side view, partly in section, of our improved seeding-machine; and Fig. 2, a plan view of the same.

This invention relates to a class of articles known as "seeding-machines;" and it consists in providing an ordinary frame having a roller rearwardly, forwardly of which we provide a drill and seed-box having therein a feed-roller having on its periphery a series of recessed hooks, which, as the said roll is revolved, carry the seed over and deposit it in the tube leading to the drill, and forward of the roller a revolving comb or brush is placed to remove all the superfluous seed from the periphery of the roller, all of which will now be fully set forth in detail.

In the accompanying drawings, A represents an ordinary seeder-frame, the forward part of which consists of thills to receive therein the animal, and provided rearwardly with a roll, B, and in front a series of ordinary shovels, C, transversely disposed. Above the roll B an ordinary seat-frame, D, may be placed for the use of the operator. The series of shovels C are secured to a single frame, E, having a projecting arm hinged forwardly at F, so that the said shovels may accommodate themselves to the unevenness of the ground.

Immediately above the series of shovels C, and resting upon the frame A, we provide a seed-box, G, having therein a cylinder or feed-roller, H, journaled within the ends of the said seed-box G, and operated by means of a belt extending from a pulley, I, on one end of this said roller to the pulley J at the end of the roll B. Rearwardly of the seed-box G we provide a series of vertical tubes, K, opening from this said seed-box and terminating at the lower part of the device immediately in the rear of the shovels C, the number of tubes K corresponding with the number of shovels C in each machine. This number may be varied as the device is to be used for different classes of seeds. The seed roller H is provided on its periphery with a number of recessed hooks, L. These hooks are so disposed thereon that a series of them may correspond with each independent tube K of the series. Above and somewhat forward of this said roller H, and within the top of the seed-box, we provide a revolving brush, M, journaled in the ends of the seed-box, and operated in an opposite direction from the seed-roller H by means of a belt, N, connected with a pulley on the end of the said roller H, so that it may come in contact with the recessed hooks L.

To operate this interesting and novel device the seed is placed within the box G, and as the device moves forward the belt connecting the seed-roller H with the pulley J of the roll rearwardly causes the said seed-roller to revolve, thus carrying the seed up and over the said roll, and as it reaches the rear side of the roller H it drops into the tubes K, where it is conveyed to the furrow immediately in the rear of the shovels C.

We prefer to form the recessed hooks L of metal and of such a size as to carry a sufficiency of seed for a single hill. The revolving brush M is designed to rotate with the feed-roller H, so that all loose seed clinging to the roller and not within the recessed hooks may be brushed back into the seed-box, and thus only a limited and certain amount of seed be carried over the roller.

We are aware that seed-rollers have been recessed to form depressions to receive and accommodate the seeds, and we therefore disclaim such construction; but we are not aware that a series of recessed hooks have been driven into an imperforate roller for this purpose.

We therefore desire to claim and secure by Letters Patent—

1. The combination, in a seeding-machine, of the roller having an unbroken surface provided with a series of recessed hooks secured thereto and deposited in series, so that the seed may be carried over from the bottom of the seed-box and deposited within the seed-tubes, and thus conveyed to the ground, with the revolving brush journaled in the upper part of the seed-box, to brush the periphery of the seed-roll and prevent the loss of seed in passing over said roller, substantially as herein set forth.

2. The combination of the seed-roller having an unbroken surface, journaled within the seed-box, and provided with a series of recessed hooks, and a revolving brush journaled within the seed-box, the two operated by means of a belt from the roller rearwardly, and the seed-box and vertical tubes to convey the seed therefrom, with the series of shovels within a frame hinged forwardly beneath the device, substantially as herein set forth.

3. The combination of the frame A, the roll B, the shovel-frame E, hinged forwardly beneath the device, the vertical tubes K, the seed-box G, having therein the seed-roller H, having an unbroken surface, and revolving brush M, the whole arranged as and for the purpose substantially as herein set forth.

In testimony that we claim the foregoing we have hereunto set our hands, this 17th day of July, 1885, in the presence of witnesses.

DANIEL S. TROY.
JOHN S. DAVIS.

Witnesses:
ALEX. TROY,
J. M. DAVIDSON.